United States Patent [19]

Wrighton et al.

[11] 4,414,300

[45] Nov. 8, 1983

[54] VISIBLE LIGHT TO ELECTRICAL ENERGY CONVERSION USING PHOTOELECTROCHEMICAL CELLS

[75] Inventors: Mark S. Wrighton, Medford; Arthur B. Ellis, Brookline, both of Mass.; Steven W. Kaiser, South Charleston, W. Va.

[73] Assignee: Massachusetts Institute of Technology, Cambridge, Mass.

[21] Appl. No.: 782,596

[22] Filed: Mar. 29, 1977

[51] Int. Cl.³ .............................................. H01M 6/36
[52] U.S. Cl. .................................................... 429/111
[58] Field of Search ........................................ 429/111

[56] References Cited

U.S. PATENT DOCUMENTS 4,064,326  12/1977  Manassen et al. .................. 429/111

OTHER PUBLICATIONS

M. S. Wrighton et al., "Visible Light to Electrical Energy Conversion, Stable CdS and CdSe Photoelectrodes in Aqueous Electrolytes", *J. Am. Chem. Soc.*, vol. 98, pp. 1635–1637, Mar. 17, 1976.

G. Hodes et al., "Photoelectrochemical Energy Conversion and Storage Using Polycrystalline Chalcogenide Electrodes", *Nature*, vol. 261, pp. 403–404, Jun. 3, 1976.

*Primary Examiner*—Aaron Weisstuch
*Attorney, Agent, or Firm*—Arthur A. Smith, Jr.; George W. Neuner

[57] ABSTRACT

Sustained conversion of low energy visible or near i.r. light (>1.25 eV) to electrical energy has been obtained using wet photoelectrochemical cells where there are no net chemical changes in the system. Stabilization of n-type semi-conductor anodes of CdS, CdSe, CdTe, GaP, GaAs and InP to photoanodic dissolution is achieved by employing selected alkaline solutions of $Na_2S$, $Na_2S/S$, $Na_2Se$, $Na_2Se/Se$, $Na_2Te$ and $Na_2Te/Te$ as the electrolyte. The oxidation of (poly)sulfide, (poly)selenide or (poly)telluride species occurs at the irradiated anode, and reduction of polysulfide, polyselenide or polytelluride species occurs at the dark Pt cathode of the photoelectrochemical cell. Optical to electrical energy conversion efficiencies approaching 15% at selected frequencies have been observed in some cells. The wavelength for the onset of photocurrent corresponds to the band gap of the particular anode material used in the cell.

7 Claims, 1 Drawing Figure

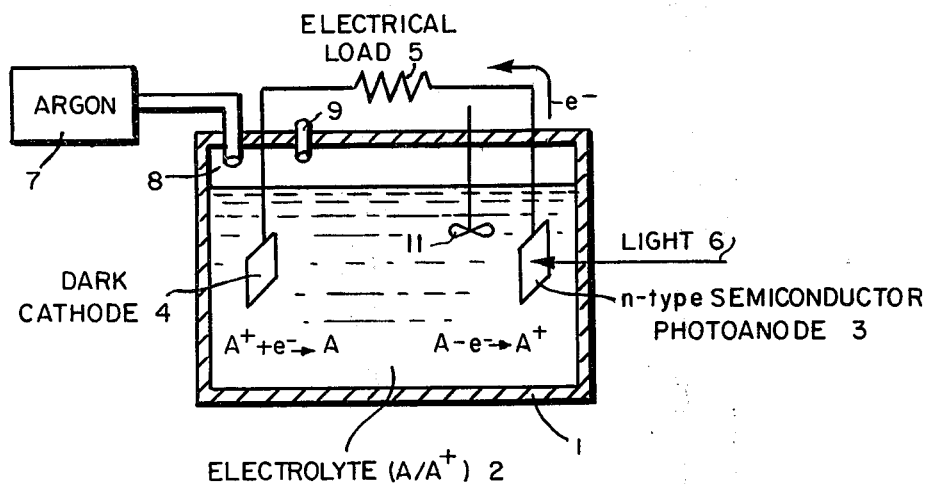

VISIBLE LIGHT TO ELECTRICAL ENERGY CONVERSION USING PHOTOELECTROCHEMICAL CELLS

This invention resulted from work supported by the U.S. Government under NASA Contract NSG 1048.

BACKGROUND OF THE INVENTION

This invention relates to photoelectrochemical cells and more particularly to cells which have stable anodes responsive to solar radiation.

Much attention is now turning to photoelectrochemical cells as a means of converting optical energy to chemical fuels and/or electricity. The interest in this field has been stimulated by recent work showing that photoanodes fabricated from n-type semiconducting $TiO_2$, $SnO_2$, $SrTiO_3$, $KaTaO_3$, $KTa_{0.77}Nb_{0.23}O_3$, $WO_3$, and $Fe_2O_3$ are stable to photoanodic dissolution in aqueous electrolytes. Metal oxide-based photoelectrochemical cells involving these materials have been shown to convert light to chemical energy in the form of the photoelectrolytic products $H_2$ and $O_2$ from $H_2O$. These systems, though they are all stable, either respond only to ultraviolet light or have poor current-voltage properties. n-Type semiconductors which a priori have satisfactory properties in terms of energetic requirements (small band gap, good band positions relative to the redox potential of the substrates) are generally found to undergo photoanodic dissolution. That is, though the oxidation of $H_2O$ may be energetically feasible, the rate of processes leading to $O_2$ or $H_2O_2$ production from $H_2O$ does not compete with the photoanodic dissolution of the semiconductor. The photoanodic dissolution of n-type semiconductors is viewed as a key problem in the general use of photoelectrochemical devices for synthesis, fuel generation, and electricity production.

Photoelectrochemical cells using n-type CdS or CdSe anodes (band gaps of 2.4 and 1.7 eV, respectively) have long been known to produce a photocurrent when exposed to radiation. However, anodes made of these materials are subject to photoanodic dissolution to yield $Cd^{2+}$ ions and chemical S or Se. Other potentially useful semiconductor photoelectrodes CdTe, GaP, GaAs and InP (band gaps of 1.4, 2.24, 1.35 and 1.25 eV, respectively) also respond to large fractions of the solar spectrum, but the irreversible decomposition encountered in their use as photoelectrodes is a serious detriment to their use in practical solar energy systems.

It is, therefore, a primary object of this invention to provide photoelectrochemical cells which are responsive to large segments of the solar energy spectrum and which are not susceptible to photoanodic decomposition.

It is a feature of this invention that only the electrolyte composition need be modified in order to produce the stable, non-decomposing photoanodes of this invention.

These and other objects and features of the invention will become apparent from the following specification read in conjunction with the FIGURE which is a cross-sectional view of a photoelectrochemical cell used in the practice of this invention.

SUMMARY OF THE INVENTION

Sustained conversion of low energy visible or near i.r. light ($>1.25$ eV) to electrical energy has been obtained using wet photoelectrochemical cells where there are no net chemical changes in the system. Stabilization of n-type semiconductor anodes of CdS, CdSe, CdTe, GaP, GaAs and InP to photoanodic dissolution is achieved by employing selected alkaline solutions of $Na_2S$, $Na_2S/S$, $Na_2Se$, $Na_2Se/Se$, $Na_2Te$ and $Na_2Te/Te$ as the electrolyte. The oxidation of (poly)sulfide, (poly)selenide or (poly)telluride species occurs at the irradiated anode, and reduction of polysulfide, polyselenide or polytelluride species occurs at the dark Pt cathode of the photoelectrochemical cell. Optical to electrical energy conversion efficiencies approaching 15% at selected frequencies have been observed in some cells. The wavelength for the onset of photocurrent corresponds to the band gap of the particular anode material used in the cell.

DESCRIPTION OF THE INVENTION

Sustained, efficient conversion of low energy visible or near i.r. light to electricity has been demonstrated using conventional photoelectrochemical cells like that depicted in the FIGURE. A container 1, shown in cross-section, contains an electrolyte 2 in which are immersed an anode 3 and a cathode 4 externally connected to each other by an electrical load 5. The container 1 is transparent to incident radiation 6 from a source such as the sun so that the incident light 6 impinges on the anode 3. Since the electrolytes 2 of this invention are oxygen sensitive, the electrolyte is purged or sealed in an argon atmosphere provided by argon source 7.

A key element of this invention is that the reversible redox systems employed not only result in no net chemical change in the electrolyte but also stabilize the n-type semiconductor photoelectrode to photoanodic dissolution. Presumably, the electrolyte additive is capable of undergoing photoinduced oxidation at the semiconductor electrode at a rate which completely overwhelms the general photoanodic dissolution reaction of the small band gap n-type semiconductors.

Results of the CdX-based photoelectrochemical cells in $X^{2-}/X_n^{2-}$ electrolytes are disclosed for $X=S$, Se, Te. For eight of the nine electrode/electrolyte combinations we have demonstrated that the n-type semiconducting single crystal CdX photoelectrodes are stable to anodic dissolution. Only for CdTe in $S^{2-}/Sn^{2-}$ do we find that oxidation of the added chalcogenide does not quench the decomposition of CdX typically found in aqueous electrolytes. For all eight remaining electrolyte/electrode combinations the added chalcogenide is oxidized at the photoelectrode at a rate which precludes anodic dissolution of the CdX. For the stable combinations each electrolyte is capable of being oxidized at the photoelectrode and subsequently reduced at the dark counter electrode to complete a cycle where no net chemical change obtains. For all nine electrolyte/electrode combinations and for the CdX in alkaline $H_2O$, the redox level associated with the oxidation of $X^{2-}$ or with $O_2$ evolution is between the valence band and conduction band positions at the semiconductor-electrolyte interface. Thus, energetic requirements for $X^{2-}$ oxidation or $O_2$ evolution from $H_2O$ are met in all cases, but apparently kinetic factors control whether oxidation of $X^{2-}$ or of $H_2O$ will be fast compared to anodic dissolution, which is also energetically feasible. For the stable electrode/electrolyte combinations, conversion of optical to electrical energy can be accomplished with efficiencies of $>10\%$ for monochromatic visible light. For CdTe or CdSe in the $Te^{2-}/Te_2^{2-}$ electrolyte input power densities of >500 mW/cm$^2$ can be converted with a few percent efficiency with no deterioration of properties. Output voltages at maximum power conversion efficiency are of the order of 0.4 V.

Irradiation of either CdS or CdSe single crystal electrodes in a cell with a Pt cathode results in current such that electrons flow toward Pt. In 1.0 M NaOH as the electrolyte the photocurrent falls very rapidly with irradiation time, and the production of elemental sulfur on CdS or elemental selenium on CdSe is very obvious at a reasonable light intensity. By adding either Na$_2$S, or Na$_2$S and S, to the 1.0 M NaOH, a very stable photocurrent can be sustained by constant visible light irradiation. We have demonstrated that sulfide is oxidized with ~100% current efficiency by monitoring electrode stability and visible electrolyte spectral changes as a function of irradiation time. This oxidation completely "quenches" photoanodic dissolution of either CdS or CdSe.

In the absence of zero valent sulfur, H$_2$ is evolved initially at the Pt cathode. When zero valent sulfur is added (or photogenerated), H$_2$ evolution is quenched to some extent, dependent on current density. Presumably, the reaction occurring at the cathode in the presence of zero valent sulfur is the reduction of some polysulfide species. We have found that electrolytes containing 1.0 M NaOH, 1.0 M Na$_2$S, and 1.0 M S yield no H$_2$ evolution at the cathode at any current density up to 20 mA/cm$^2$.

Substantial anodic photocurrents result in no deterioration of CdS or CdSe in the (poly)sulfide-containing electrolytes for average current densities which range from approximately 1 to 16 mA/cm$^2$. At very high light intensities one typically observes some decline in photocurrent and some surface discoloration of the crystal, but in no case have we observed any significant weight loss in either CdS or CdSe, even after the passage of substantial current for prolonged periods.

The minimum concentration of added sulfide or polysulfide that will completely quench the photoanodic dissolution depends on the current density. With respect to the quantitative measurements that we have made, we can say definitely that alkaline electrolytes containing at least 0.2 M Na$_2$S do yield stable photoelectrodes at current densities up to 16 mA/cm$^2$.

The arbitrary use of the 1.0 M NaOH, 1.0 M Na$_2$S, and 1.0 M S electrolyte for all energy conversion measurements seems justified in view of the optimal current-voltage properties obtained in this electrolyte. Incidentally, prolonged irradiation of the electrolyte itself results in no discernible changes.

At low light intensities, we have measured $\eta_{max}$ values as high as 9.2% for CdSe, irradiated at 632.8 nm. This electrical power output occurs at a potential of 0.35 V. Likewise at low light intensities we have measured $\eta_{max}$ values as high as 6.8% for CdS at 500 nm and 0.30 V.

A photoelectrochemical cell having an anode of CdTe can be stabilized by an electrolyte additive. Unlike CdSe, a sulfide or polysulfide-containing electrolyte did not stabilize the CdTe anode. However, CdTe can be stabilized in 5.0 M NaOH by adding Na$_2$Te which dissolves to give Te$^{2-}$ ions oxidizable at the CdTe anode. CdTe undergoes no photoanodic dissolution in solutions containing as little as few hundredths molar Te$^{2-}$. Oxidation of the added Te$^{2-}$ occurs and yields the Te$_2^{2-}$ ion in the presence of significant quantities of Te$^{2-}$. The Te$_2^{2-}$ cannot increase to a concentration more than one-half that of the initial Te$^{2-}$ concentration, but before this occurs the Te$_2^{2-}$ becomes active at the cathode and is reduced back to Te$^{2-}$. Thus, a chemical equilibrium of Te$^{2-}$ and Te$_2^{2-}$ is ultimately established. Before substantial buildup of Te$_2^{2-}$, the evolution of H$_2$ is still observed at the Pt electrode.

Extracting electrical energy from the CdTe-based photoelectrochemical cell depends on being able to generate an open-circuit photopotential in the Te$^{2-}$/Te$_2^{2-}$ electrolyte. We have obtained open-circuit photopotentials of up to ~0.7 V. The maximum overall optical to electrical energy conversion that we have measured is 10.7% at 633 nm. and from wavelength response data we calculate efficiencies of 14 and 7% at 800 and 400 nm. respectively, at the same light intensity. The efficiency suffers at higher intensities as we found with CdS- and CdSe-based cells, but the main finding is that good open-circuit voltages, respectable efficiencies at high incident intensity, excellent wavelength response, and good stability all obtain in the Te$^{2-}$/Te$_2^{2-}$ electrolyte.

A CdTe anode is also stable in an electrolyte containing polyselenide. The electrolyte may initially consist of ~0.02 M Na$_2$Se and 5 M NaOH in H$_2$O. As in the other electrolytes, oxidation of Se$^{-2}$ to zero valent Se initially obtains at the anode with H$_2$ evolution at the dark cathode. Cyclic oxidation and reduction of the polyselenide species follows. Se could be added initially if desired. Efficiency of about 9% was obtained with 633 nm radiation.

CdS and CdSe are stable photoanodes in electrolytes containing polyselenide and polytelluride. An electrolyte initially consisting of 0.03–0.18 M Na$_2$Te in aqueous 5.0 M NaOH can quench photoanodic dissolution of CdS, CdSe and CdTe as can an electrolyte initially consisting of 0.01 M Na$_2$Se and 5.0 M NaOH in H$_2$O. Elemental selenium or tellurium may be added but as stated elsewhere in this application oxidation of Se$^{-2}$ to zero valent selenium and of Te$^{-2}$ to zero valent tellurium occurs at the anode followed by cyclic oxidation and reduction of the polyselenide and polytelluride. Efficiencies of 1–3% are obtained for the CdS and CdSe anodes in these electrolytes.

The stability of n-type semiconducting GaAs, GaP, and InP photoanodes in photoelectrochemical cells employing the above X$^{2-}$/X$_n^{2-}$ electrolytes is also disclosed. For 1 M OH$^-$/1 M S$^{2-}$/1 M S (polysulfide) electrolyte, GaAs, and InP were shown by irradiation at 633 nm to be unstable by virtue of weight loss and surface damage. In the case of GaP, the polysulfide electrolyte absorbs too strongly at $\lambda \leq 500$ nm for GaP (wavelength response onset ~530 nm) to be strongly irradiated. In transparent 1 MOH$^-$/1 MS$^{2-}$, however, there is no oxidation of S$^{2-}$ to S$_n^{2-}$ such as is observed for CdS- and CdSe-based cells. Instead, both surface damage and weight loss occur. Thus, GaP, GaAs and InP are not stable in sulfide or polysulfide electrolyte. GaP anodes are stable in both polyselenide and polytelluride while GaAs and InP are stable in polytelluride while exhibiting some stability in polyselenide.

An electrolyte solution initially containing 0.10 M Se$^{2-}$ at 63° F. was used to determine whether the oxidation of Se$^{2-}$ to polyselenide, Se$_n^{2-}$, would compete effectively with GaP and GaAs dissolution. GaAs was partially stable. Some oxidation of Se$^{2-}$ occurs, but there is long term weight loss and surface damage to GaAs. For GaP, however, there was clear evidence of stabilization since no weight loss of GaP occurred upon prolonged irradiation; there was no apparent surface damage either. The cathodic dark reaction at Pt is initially evolution of $H_2$, but as the concentration of $Se_n{}^{2-}$ increases, reduction of the $Se_n{}^{2-}$ competes with $H_2$ evolution. Eventually, the $Se^{2-}/Se_n{}^{2-}$ ratio becomes a constant value and photocurrent passes with no net chemical change in either the electrolyte or the GaP photoelectrode.

Analogous experiments were performed in 0.10 M $Te^{2-}$ at 50° F. to determine if the oxidation of $Te^{2-}$ to $Te_2{}^{2-}$ could successfully compete with the photoanodic dissolution of GaP and GaAs. Both semiconductors are stable in this medium, showing neither weight loss nor surface damage after prolonged irradiation. Initially, as in the $Se^{2-}$ electrolyte, $H_2$ is evolved at the cathode, but as the concentration of $Te_2{}^{2-}$ increases, the $Te_2{}^{2-}$ is reduced at the cathode, and the electrolyte ultimately consists of a constant ratio of $Te^{2-}$ and $Te_2{}^{2-}$.

Consistent with the model for photoelectrochemical cells, the photocurrent onset is at the onset of absorption corresponding to a valence band (VB) to conduction band (CB) electronic transition. At about 530 nm there is a strong, sharp increase in absorption for GaP, corresponding to the band gap of 2.24 eV. The wavelength response curve for GaAs in either the $Te^{2-}$- or $Se^{2-}$-containing electrolyte is consistent with absorption data, in that the onset of photocurrent corresponds closely to the absorption onset near 930 nm, in accord with the known direct band gap of 1.35 eV.

The maximum energy conversion efficiency for all three stable electrode/electrolyte combinations is roughly the same, 1–4%, over a wide range of light intensities. These numbers are quite respectable, although not as good as the 5–10% routinely observed for the stable $CdX/X^{2-}/X_n{}^{2-}$) combinations.

InP is found to be partially stable in Se electrolytes and completely stable in the Te electrolyte. Efficiency for energy conversion is about 1%.

GaP, GaAs and InP were all unstable in the S electrolyte.

Table I summarizes the behavior of the anodes in polychalcogenide electrolytes disclosed earlier in the application. "Stable" behavior means that for the indicated combination of electrode and electrolyte, enough equivalents of electricity were passed to decompose a substantial fraction of the crystal, yet no weight loss or surface damage was observed. "Unstable" combinations do not meet these criteria.

TABLE I

| Electrolyte/ Electrode | $S^{2-}/S_n{}^{2-}$ | $Se^{2-}/Se_n{}^{2-}$ | $Te^{2-}/Te_2{}^{2-}$ |
| --- | --- | --- | --- |
| CdS | stable | stable | stable |
| CdSe | stable | stable | stable |
| CdTe | unstable | stable | stable |
| GaP | unstable | stable | stable |
| GaAs | unstable | some stability | stable |
| InP | unstable | some stability | stable |

Anode materials other than those presented earlier in this application may also be advantageously used in this invention. For example, all semiconducting metal chalcogenides such as ZnS, ZnSe, ZnTe, mixed Cd/Zn and Cd/Hg species and S/Se/Te species such as $CdS_{0.5}Se_{0.5}$ are suitable anode materials. Also, other known semiconductors, which suffer from photodecomposition when used as photoelectrodes, are stabilized by electrolyte additives which rapidly scavenge photogenerated holes thereby quenching any reaction of the anode electrode itself.

Electrolytes

Since sulfide and polysulfide solutions are air sensitive, all preparations and experiments were done with an Ar-purge. The addition of 0.1 mole each of NaOH, $Na_2S.9H_2O$ to 100 ml of Ar-purged distilled water gave stable 1 M sulfide electrolyte. 1 M polysulfide solutions are prepared from purged sulfide solutions by the addition of 0.1 M sublimed sulfur.

To prepare $Na_2Se$ and $Na_2Te$, typically, 1.0 g of Te powder of Se, and 4.0 g of $Na_2S_2O_4$ were added to 50 ml of Ar-purged 10% NaOH. Heating the solution to 70° C. turned it purple or brown as ditelluride or polyselenide, respectively, was formed. After 30 min, the solution cleared, indicative of complete reduction to $Te^{2-}$ or $Se^{2-}$. White crystals of $Na_2Se$ or $Na_2Te$ precipitated. After filtration any remaining $Na_2S_2O_4$ was removed by three washes with cold 10% NaOH. No attempt was made to completely dry the solids since this results in the formation of some colored ditelluride or polyselenide. Stock solutions were made by dissolving the $Na_2Te$ or $Na_2Se$ in Ar-purged 5 M NaOH. Exposing the solutions to air quantitatively precipitates all of the telluride ($Te^{2-}$ and $Te_2{}^{2-}$) or selenide ($Se^{2-}$ and $Se_n{}^{2-}$) as the element. The weighed precipitate of a given solution volume indicated that the synthesis of $Na_2Te$ or $Na_2Se$ results in 80% yield and that their solubilities in 5 M NaOH at 25° C. are 0.03 M and 0.005 M, respectively. The solutions are stable indefinitely (even at elevated temperatures) if rigorously protected from air.

The molar concentration of the electrolytes was not critical to cell performance. Normally, 1 M polysulfide solution was used, although electrolyte composition of 1–1.25 M NaOH, 0.2 M $Na_2S$; 1 M NaOH, 0.2 M $Na_2S$, 1.0 M S; 1.0 M NaOH, 1.0 M $Na_2S$, 0.05 M S; were also used with small difference in performance. At least 0.2 M $Na_2S$ is needed to quench oxidation of the anode. If the electrolyte contains no S, then initially $H_2$ is generated and no electricity is produced until the $S^{2-}/S$ equilibrium is established.

The selenide and telluride electrolytes were typically 1 M NaOH, 0.1 M $Na_2Se$, 0.1 M Se and 1 M NaOH, 0.1 M $Na_2Te$, 0.1 M Te. The maximum concentrations of the $Se^{2-}/Se$ and $Te^{2-}/Te$ were limited to about 0.1 M by solubility limitations. The temperature of these electrolytes was in the vicinity of 50°–65° F. but is not critical.

For electrolytes where the concentration of the polychalcogenide solution is low, such as 0.1–0.2 M, the electrolyte should be stirred to increase the mobility of the ions. The stirring can be accomplished by the argon purging or by a mechanical stirrer. For higher concentrations such as 1.0 M polychalcogenide, the ion concentration is large enough that normal diffusion will be adequate to accomplish the redox function.

Although NaOH was used in all the examples of electrolytes in the embodiment of this invention, other hydroxides, such as KOH, may be used instead. The metal ion of the hydroxide or chalcogenide is not involved in the cell chemistry.

Cell Materials

The stability of the anodes was not affected by whether they were crystals or polycrystalline. However, the efficiency of the single crystals generally was substantially improved by etching the exposed surface. Electrodes were mounted by first rubbing gallium-indium eutectic on a face of the crystal, then placing the eutectic-coated face on a glass-encased Cu wire whose end has been coated with conducting Ag epoxy. Ordinary epoxy was used to insulate all exposed metal.

A Pyrex container 1 was used for the cells. For polysulfide electrolyte, Ar purging protected the polysulfide from the air and was used to stir the solution. For the more air-sensitive solutions of $Te^{2-}$ or $Se^{2-}$, a tube 8 through the container 1 above the electrolyte level can be employed for Ar flow. The top of the cell container 1 was covered but has a vent 9 for the escape of argon. The electrolytes may also be protected from the air by being sealed under Ar in container 1. A stirrer 11 was used for the 0.1 M polytelluride and polyselenide electrolytes to supplement the diffusion of the ions. No stirring is required when 1 M polysulfide solutions are used.

Efficiency

We have measured power conversion in a cell as in FIG. 1. The "load" in series in the external circuit has been a variable power supply. A negative bias ("−" lead to CdS or CdSe, "+" lead to cathode) will "resist" the flow of an anodic photocurrent, and the power supply then represents a load in the external circuit. At any negative applied potential where an anodic photocurrent can be observed, the cell is actually producing electric power. Power output is equal to the photocurrent times the negative applied potential. The maximum power output for a given input light power can be easily determined from a plot of photocurrent vs. applied potential from the power supply. One simply finds the maximum value of the product of current and voltage. Incidentally, we have measured identical power conversion by replacing the power supply with a resistor in series in the external circuit where the power output is then just the (current)$^2$ times resistance.

The maximum efficiency for conversion of optical energy to electrical energy, $\eta_{max}$ in percent, is given by $$\eta_{max} = \frac{(current \times potential)_{max}}{optical\ power\ in} \times 100.$$

It is evident that those skilled in the art, once given the benefit of the foregoing disclosure, may now make numerous other uses and modifications of, and departures from the specific embodiments described herein without departing from the invention concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. A photoelectrochemical cell comprising
   an n-type semiconductor anode,
   a metallic cathode,
   an alkaline electrolyte containing chalcogenide/polychalcogenide species,
   said anode and cathode being immersed in said electrolyte,
   said anode capable of being exposed to light,
   said chalcogenide/polychalcogenide is selenide/polyselenide, and
   said anode is GaAs.
2. The cell of claim 1 wherein
   said electrolyte comprises an H$_2$O solution of hydroxide,
   elemental selenium,
   and an alkali metal selenide.
3. The cell of claim 2 wherein
   said hydroxide is NaOH,
   said selenide is Na$_2$Se.
4. A photoelectrochemical cell comprising
   an n-type semiconductor anode,
   a metallic cathode,
   an alkaline electrolyte containing chalcogenide/polychalcogenide species,
   said anode and cathode being immersed in said electrolyte,
   said anode capable of being exposed to light,
   said chalcogenide/polychalcogenide is telluride/polytelluride, and
   said anode is selected from GaAs and InP.
5. The cell of claim 4 wherein
   said electrolyte comprises an H$_2$O solution of hydroxide,
   elemental tellurium,
   and an alkali metal telluride.
6. The cell of claim 5 wherein
   said hydroxide is NaOH,
   said telluride is Na$_2$Te.
7. A photocell containing a photovoltaic junction between n-type gallium arsenide and a liquid electrolyte containing a redox couple; characterized in that said redox couple consists of anions selected from the group consisting of selenide and telluride.

* * * * *